United States Patent Office 3,232,547
Patented Feb. 1, 1966

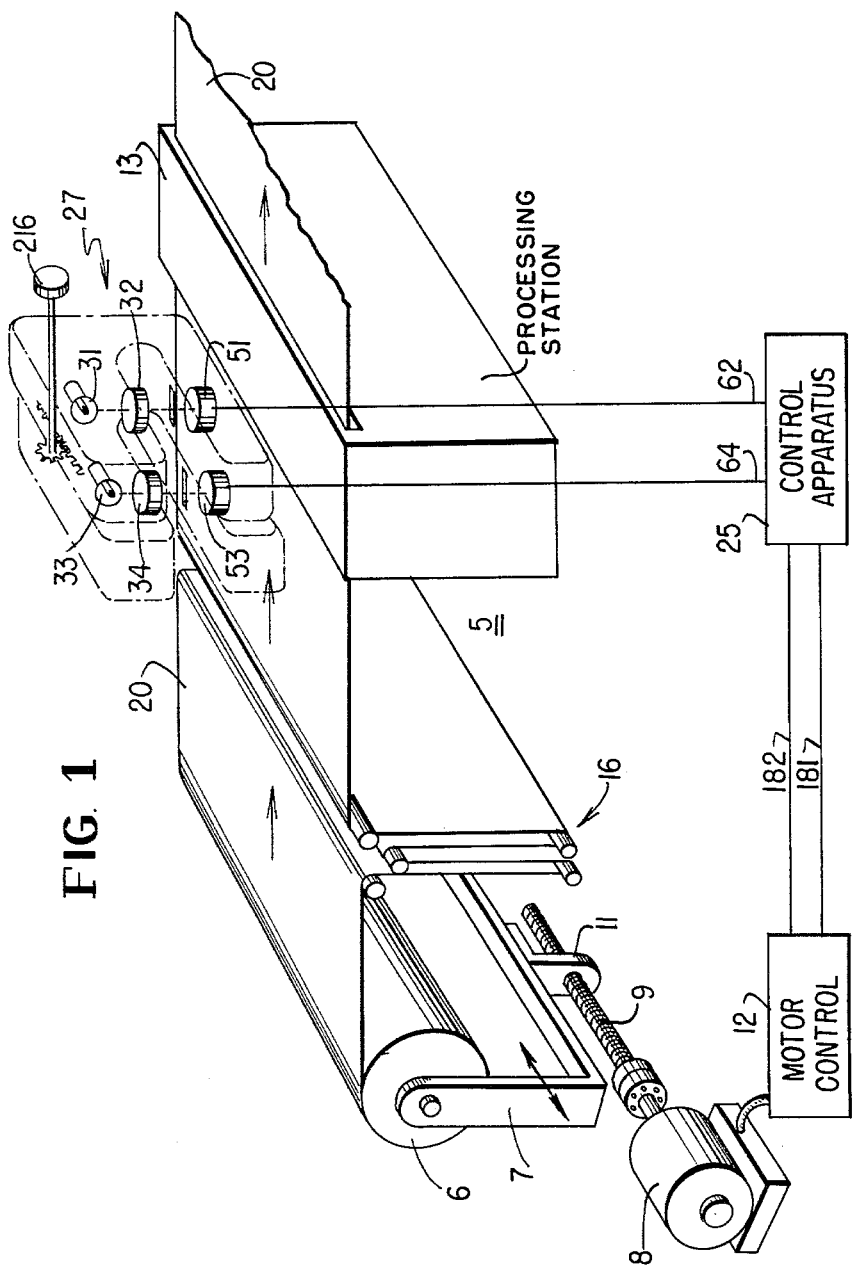

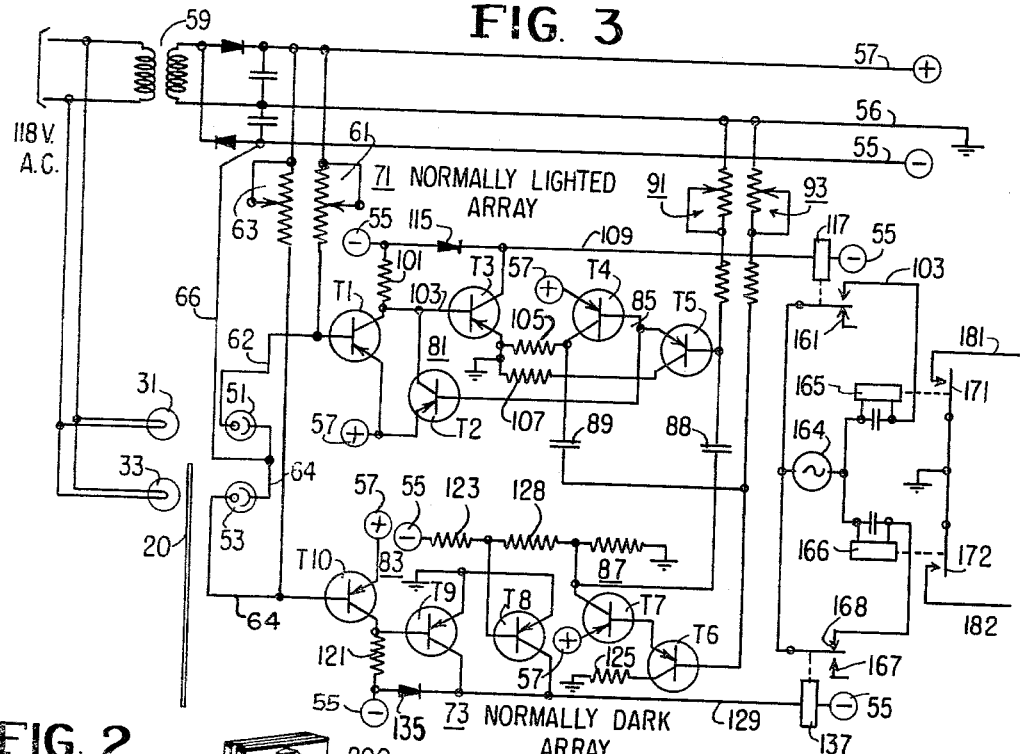
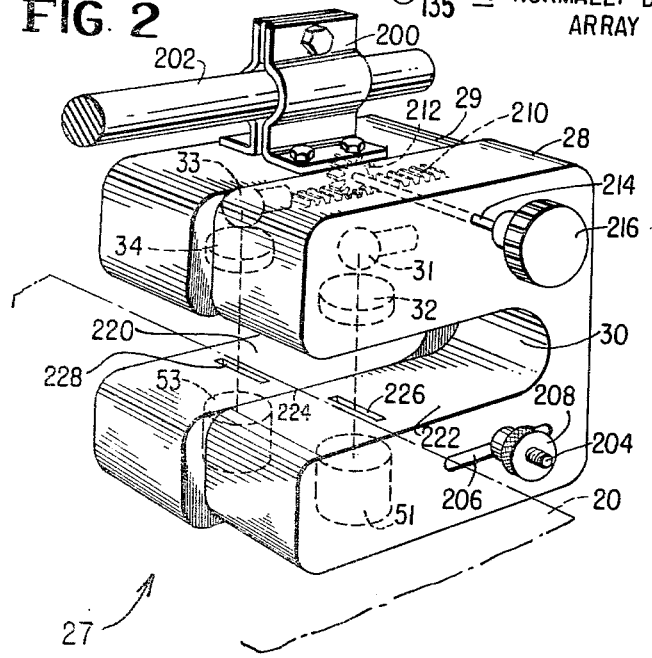
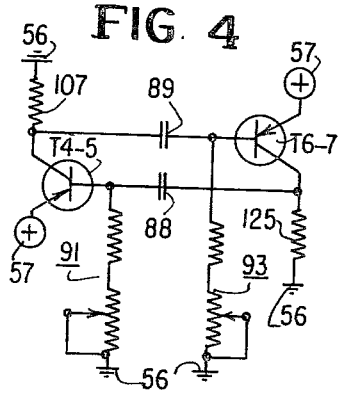
INVENTORS
Paul W. Thiede
Carl L. Deeken.

3,232,547
EDGE MONITOR DEVICE
Paul W. Thiede and Carl L. Deeken, Danville, Ill., assignors to Hurletron Incorporated, Danville, Ill., a corporation of Delaware
Filed Aug. 3, 1962, Ser. No. 214,559
2 Claims. (Cl. 242—57.1)

This invention relates to the control of moving flexible webs. More particularly, and in an important aspect, this invention relates to means for sensing the lateral position of a longitudinally transported web and for deriving appropriate control signals from this sensing in order to effect corrections for any deviation of the web from a desired lateral position.

In the processing of a longitudinally moving web it is highly important, as for registry purposes, that such a web be positioned laterally with extreme accuracy as the web is transported longitudinally at very high speeds. For electromechanically accomplishing this positioning, a particularly advantageous arrangement has been disclosed and claimed by J. C. Frommer and U. R. Furst in a co-pending application, Serial No. 801,503, filed March 24, 1959, assigned to applicants' assignees and granted May 21, 1963 as U.S. Patent 3,090,534.

Structure which is described and claimed in the said patent provides precise lateral positioning with a high degree of accuracy. This is done by a mechanicl positioning apparatus located immediately at the site where the deviation from the desired position is being measured. This would take care of fine deviations. It is desired, however, in many circumstances either to augment very fine control of the lateral position of the web with coarse control such as, for example, control operating on the white roll of a printing press; or in certain instances, to use a less accurate control than that proposed by the said co-pending application where very precise control is not needed.

The invention herein is concerned with an extremely simple and economical edge monitoring device which is readily installed and serviced and which gives practically foolproof operation because of the simple nature of the circuitry and which further may operate into practically any kind of adjusting device which the user may desire. Primarily, the structure of the invention was designed for operating white roll controling apparatus, but with or without suitable modification, it may be used in other manners. For example, with suitable amplifiers, the structure of the invention herein may be utilized with a hydraulic steering roll arrangement such as shown in said copending application.

Accordingly, it is the primary object of the invention to provide an edge monitoring device which is extremely simple in construction, operation, installation and maintenance.

Toward rendering the control structure in accordance with the invention most effective in cooperation with mechanical positioning apparatus, it is accordingly an object of the invention to monitor the lateral positioning of a web structure under process in the course of longitudinal transport of the web.

It is a further object of the present invention to derive control signals for directing the operation of mechanical apparatus for laterally positioning such a longitudinally transported web.

It is a further object of the present invention to derive web monitoring signals which are adjustable in fineness of monitoring control thus to avoid precision beyond that consistent economically with the demands of required web processing.

It is a further object of the present invention to derive web position monitoring signals which are unambiguous.

It is a further object of the present invention to derive web position control signals which alternate between unequivocal values thus to avoid adverse control effects which may result either from control component failure or from mechanical perversities such as inertia and the like.

These and other objects are achieved in accordance with the present invention in one embodiment, with a pair of laterally spaced apart, photo-responsive elements positioned on either side of a desired web edge lateral position to receive illumintion from respectively associated sources. These sources, which in this illustrative embodiment, are light bulbs, are positioned vertically opposite the photo-responsive elements with respect to the monitored web. These sources and these responsive elements are mounted in a frame structure to establish a sensing station which is adapted for positioning longitudinally along the path of travel of a monitored web. The responsive elements, further, are mounted for adjustable lateral positioning in the frame structure in accordance with a desired web edge position to be monitored.

The responsive elements, further, are characterized in being responsive to optical signals in a frequency range to which the web is opaque. Thus the web acts selectively to shield the photo-responsive elements which are laterally positoned to be shielded by the edge portions of the moving web.

Signals derived from the two photocells act to govern interconnected control signal generating circuitry. In accordance with the present invention there are provided two signal generating channels. The one of these channels is associated with the normally illuminated one of the two above noted photocells. The other channel is assocaited with the photocell normally shielded from illumination by the web itself.

A terminal component group of each channel is one element of a two element bistable oscillator. Such an oscillator in this embodiment is a familiar multivibrator. These two groups are appropriately interconnected, as is well known in the multivibrator art, to provide mutual feedback. At the same time the two groups are interconnected with other elements of the two channel signal generating circuitry for exercising supervisory control over the signals generated by these channels.

Thus, in a normal situation where the one photocell is illuminated and the second photocell is darkened, a control signal is generated in the first channel to maintain an actuating mechanism such as an armature controlling coil in a de-energized condition.

At the same time, the second channel associated with the darkened photocell generates a control signal for maintaining a second armature controlling coil in an energized condition. Thus the two armatures are placed in positions for directing currents from a source through either or both of two supervisory paths. In this embodiment of the invention these currents, with advantage, operate any ordinary reversible motor control for driving the motor positioning the stand of a white roll. Other correcting apparatus may be used.

All mechanisms being subject to failures of various sorts, however, apparatus in accordance with this embodiment of the invention makes provision against such failure. Lateral position errors are corrected by affirmative signals. But these affirmative signals are periodically interrupted. Thus, though the respective illumination and darkening of the first and second photocells tends toward energizing a specified one of the two armature controlling coils, the aforementioned oscillating multivibrator groups are arranged and connected for supervising the noted photogenerated signals. Thus these signals, in a correcting situation, are interrupted periodically to avoid errors of inertia, for example, in the correcting mechanisms.

These and other objects and advantages achieved by structure in accordance with the invention will be more clear from a consideration of the following brief description of an illustrative embodiment of the invention shown in the drawings and from a consideration of the appended claims.

In the drawings:

FIG. 1 is a diagrammatic perspective view of a web transporting system monitored and laterally controlled in accordance with the invention;

FIG. 2 is a partially sectioned perspective view of a web monitor element in accordance with the invention;

FIG. 3 is a schematic diagram illustrating control circuits in accordance with the invention for performing control functions in cooperation with the structures of FIGS. 1 and 2; and FIG. 4 is a schematic diagram of a portion of the circuit of FIG. 3, simplified for purposes of efficiency in illustrating the functions performed.

Referring now more particularly to the drawings:

In FIG. 1 there is shown in perspective view a web positioning apparatus 5 arranged for cooperation with monitoring and control circuits in accordance with the invention.

In this FIG. 1 a web 20 of opaque material, for example, paper to be printed, is wound on a white roll 6 for longitudinal transport in the direction indicated by the arrow and for processing at an appropriate station as by printing apparatus 13. This apparatus 13 is a printing press of a type well known in the art. Clearly it is imperative that the web 20 be laterally positioned precisely in passage through the press. Thus text and the like are printed in precise registry on the web, usually in multicolor.

The lateral positioning of the web may be physically effected at several locations by apparatus controlled by the structure of the invention. In FIG. 1, the white roll 6 is mounted on a stand 7 which is adapted for translative movement transverse of the web 20. A control motor 8 is coupled to a threaded shaft 9 which engages a nut 11 secured to the stand 7. As the motor rotates one way or the other, obviously the stand 7 with the white roll will move one way or the other, as indicated by the arrow.

The motor 8 in turn is energized to rotate in one direction or the other by any suitable motor control 12, of which many exist. Usually when a customer purchases an apparatus of the type described herein, it is sold with the thought in mind that the customer will provide his own control.

It will be appreciated that white roll driving apparatus may be, and usually is, more sophisticated than that shown herein. The structure shown is merely a representative one arrangement.

It will be appreciated that the apparatus of the invention may operate upon web positioning structures other than the white roll, such as for example upon steering rollers as illustrated and described in connection with the above referred to copending application. It will be appreciated also that additional and more accurate web positioning apparatus may be used in addition to that of the invention herein.

It is desired again to point out that FIG. 1 is highly diagrammatic for simplicity. The multiple paths taken by the web in passing over the group of rollers shown at 16 may be taken to represent idlers, steering rollers, and much of the other apparatus normally associated with a printing press. Likewise the large box 13 which is designated "processing station" should be understood to include all of the apparatus necessary for printing or otherwise acting upon the moving web.

As stated above, the customer provides his own apparatus for laterally moving the white roll 6 or some other portion of the web driving equipment, and as shown herein, the invention is primarily concerned with that portion of the apparatus that leads to the motor control apparatus 12.

Electrical control signals are applied to this motor control apparatus 12 by way of leads 181 and 182 from control apparatus 25, illustrated and described in more detail hereafter in connection with FIG. 3 and FIG. 4.

As the web passes longitudinally to the right for processing by the printer 13, monitor apparatus 27, to be described hereafter in connection with FIG. 2 optically derives electrical signals indicative of the lateral positioning of the web edge.

Assume for example, that the web is displaced to the right, i.e. toward the viewer of FIG. 1, as the web passes under the inspection of monitor 27.

An electrical indicator signal passes by way of lead 62 to the control apparatus 25. In this condition, just prior to arrival of the web at a processing station, such as the printer 13, the resulting electrical signal from control apparatus 25, by way of lead 181, operates control apparatus 12 such that the motor 8 will drive the stand 7 to the left, that is away from the viewer.

Similarly, if the web, is inspected at a monitoring station as by the monitor 27, is too far away from the viewer of FIG. 1 an electrical signal is passed by way of lead 64 to the apparatus 25. The motor 8 rotates in an opposite direction because of the signal on lead 182. Thus, the web is moved in a direction toward the viewer and the erroneous lateral web position is corrected immediately. Thus printing applied by apparatus 13 is correctly registered laterally on the web.

Turning next to the structure of FIG. 2, there is seen the genesis of the indicator signals arising at a monitoring station from monitoring apparatus 27 in accordance with the invention. In this FIG. 2, the monitoring apparatus 27 is shown to comprise a pair of parallel members 28 and 29, each being generally of U-shaped configuration, but with the U lying on its side, to provide thereby a throat designated 30 through which the web 20 is adapted to pass, the web being shown in phantom so that the structure of the scanner or monitor 27 may be seen. The straight line edge of the web is shown as an elongate dot-dash line.

A suitable clamp 200 is secured to the top of the member 29 and engages upon an elongate rod 202 that extends transversely of the apparatus 5. By loosening the clamp 200, one may adjust the position of the monitor or scanner 27 relative to the web 20.

The members 28 and 29 are connected one to the other for sliding movement relative one another, perpendicular to the motion of the web 20. Suitable locking means are provided for locking the members 28 and 29 in any desired position. For example, the member 28 may have a stud 204 secured in one side thereof extending through an elongate slot 206 provided in the member 29 and engaged by a thumb screw 208. Loosening the thumb screw 208 would enable one manually to adjust the position of the members 28 and 29, one relative to the other. In order to provide for accurate positioning, a rack such as shown at 210 may be mounted in the member 28 engaged by a pinion 212 which is mounted on a shaft 214, journalled in the member 29 and fixed to the knob 216. With the locking nut loose, one may rotate the knob 216 right or left in order accurately to position the two members 28 and 29, one relative to the other.

The bottom surfaces of the throat 30 are designated 220 and 222. These surfaces are aligned and in a common plane and are adapted to move one relative to the other edge on edge. Suitable scale indicia shown at 224 operating in conjunction with arrows or other lines indicating the position of the slots 226 and 228 provide a degree of measurement for the sensitivity of control of the apparatus in a manner which will be described hereinafter in connection with the circuitry thereof.

Each of the members 28 and 29 carries portions of a pair of optical systems whose purpose it is to give the signals for correcting for lateral deviation of the web 20. The member 28 has a source of light, for example, a lamp 31 which passes through an optical system designated generally 32 and is collimated to pass through the slot 226 to a photo-responsive device such as a photoelectric cell 51. Likewise the member 29 has a similar source of illumination 33 which is directed through a collimating optical system 34 through the slot 228 and to the photoelectric cell 53.

The web is intended to pass through the throat 30 along the surfaces 220 and 222 covering the slot 228 but permitting the slot 226 to remain uncovered. Obviously, the distance between the slots laterally will control the fineness with which lateral adjustment of the web may be effected.

The photocell 53 which is on the left in FIG. 2 normally is dark and no signal is derived therefrom when the web 20 is properly positioned, while the photocell 51 normally is illuminated and a signal is derived from that photoelectric cell. Looking at FIGS. 1 and 3, it will be seen that the photoelectric cells 51 and 53 have a common lead 66 to a negative bus 55, and each has an electrical lead 62 and 64 respectively for transmitting the signals to the control apparatus 25.

Clearly, as the web moves laterally from the viewer in FIG. 2 the normally illuminated photocell 51 is shadowed by the edge portion of the longitudinally moving web. Thus, the normal electrical signal passing by way of lead 62 is terminated.

Conversely, as the web moves to the viewer in FIG. 1, away from the monitor 27, both the normally illuminated cell 51 and the normally dark cell 53 are exposed to illumination by respectively associated lamps 31 and 33. This exposure leads to electrical current conduction by way of both leads 62 and 64 to control apparatus 25. Accordingly, as discussed hereafter in more detail, an electrical signal is passed by way of lead 182 to the control apparatus 12 to direct movement of the stand 7 to the right for lateral movement of the web away from the viewer of FIG. 1.

Up to this point there have been considered only the basic mechanical structure and functioning of an illustrative structure in accordance with the invention. Since mechanical structures are usually beset with the problem of inertia in corrective arrangements, it is apparent that mechanical structures positioned laterally in accordance with the invention might tend to continue in a particular course of motion once begun. Thus, a corrective lateral movement of the web tends to overstep the needed correction owing to the mass of the moving members.

As will be seen hereafter, apparatus in accordance with this embodiment of the invention accounts for and combats this undesirable tendency. Thus, the control apparatus 25 provides correction signals by way of leads 181 and 182. Assume, for example, that a control signal by way of lead 181 indicates that the photocell 51 has been darkened and acts to move the web toward the viewer in FIG. 1. The control circuitry 25 includes arrangements whereby ON-OFF signals are impressed on the control signal normally passing by way of lead 181. Similarly, where both photocells 51 and 53 are illuminated, indicating an erroneous displacement of the web toward the viewer of FIG. 1, corrective control signals appearing on lead 182 are periodically interrupted. These interruptions insure against unnecessary continuation of a corrective lateral movement of the web once begun.

Turning next to FIG. 3, there is seen a schematic diagram of control apparatus 25 in accordance with a preferred embodiment of the invention. This control apparatus operates in cooperative relation with the elements shown in the preceding FIGS. 1 and 2. Similarly numbered elements in this FIG. 3 correspond to those of the noted preceding figures. Thus these similarly numbered elements illustrate the inter-relation of the detailed circuit of this FIG. 3 with the structures in these noted preceding figures.

In this FIG. 3 are shown the web 20, the illuminating lamps 31 and 33 and the respectively associated photocells 51 and 53. The first of these is the normally light photocell and the other is the normally dark photocell noted heretofore. Cathode electrodes of both these photocells are connected by way of lead 66 to a common negative lead 55.

This common negative lead 55 is associated with a common ground lead 56 and a common positive lead 57. All are energized from a convenient well known power source, indicated but not shown specifically, through a transformer 59. Suitable capacitors, as indicated, maintain the potential differences between these three leads and polarity determining diodes, connected in well known fashion as shown, establish the polarity of the two polarized leads 55 and 57.

In this preferred embodiment of the invention, the indicated power source is, with advantage, a constant potential transformer energized from a 115 volt, 60 cycle power line. The transformer 59 is one well known in the art and, conveniently, is of suitable turns ratio to establish negative and positive 8 volt potentials on the leads 55 and 57 respectively.

In the normal situation, photocell 51 is illuminated by a lamp 31 and conducts current through adjusting potentiometer 61. This normal situation, referring to the discussion in connection with prior FIGS. 1 and 2, corresponds to one in which the monitored edge portion of the web 20 being guided in accordance with the invention is positioned laterally between the two photocells 51 and 53. Thus the web acts to shield the latter from activating light from a source lamp 33 and expose the former to activating light rays from a second source 31.

Should photocell 53 be exposed to light rays from the associated lamp 33 by appropriate lateral displacement of the monitored web 20, clearly this latter photocell, the normally shielded, or dark photocell, will conduct through adjusting potentiometer 63. The noted potentiometers 61 and 63 serve a dual function. First, these potentiometers serve as dropping impedances such that, upon conduction by the associated photocell, an appropriate control signal is coupled to circuitry to be discussed hereafter. Second, these potentiometers serve as convenient adjusters such that apparatus in accordance with the invention may accommodate variations in current flow through commercially available photocells under like conditions of illumination.

Associated with photocells 51 and 53, respectively, are transistor arrays 71 and 73. These transistor arrays in turn, each include two subgroupings. Conveniently these subgroupings may be termed the input group and the oscillator group. Thus, within array 71 there is seen an input group 81 comprising transistors T1, T2 and T3. A corresponding, but not identical, group 83 in array 73 comprises transistors T10, T9 and T8.

The oscillator group 85 in array 71 comprises transistors T4 and T5. This group finds a counterpart in array 73 in the group 87 comprising two transistors T6 and T7. The two oscillator groups are interconnected through capacitors 88 and 89, as shown, to provide reciprocal feedback. Thus, together these latter groups form a unitary oscillator of the multivibrator type well known in the art.

For simplicity of concept, analysis reveals that in this multivibrator arrangement each of the two interconnected multivibrator groups may be replaced by single, composite transistor arrangements. Thus in FIG. 4 there is shown such an arrangement in which the transistors T4–5 and T6–7 are interconnected in a multivibrator arrangement substantially equivalent to the four transistor multivibrator of FIG. 3. In this FIG. 4 similarly numbered circuit components correspond to like elements of FIG. 3. Since the multivibrator circuit is well known in the art, discussion of the oscillator portions of FIG. 3 will hereinafter be limited, for simplicity, to a functional description of the simplified circuit of FIG. 4.

For now, however, attention is still continued on the structure of FIG. 3. Connected in the base circuit of transistors T5 and T6, respectively, are potentiometer-resistor pairs 91 and 93. As will appear more clearly from consideration of the simplified circuit of FIG. 4 and from a consideration of the overall functioning of the circuit of FIG. 3, these potentiometer-resistor pairs 91 and 93 are conveniently designated functionally as the ON time adjustment and the OFF time adjustment, respectively.

Looking now in more detail to the equivalent circuit of FIG. 4, the behavior of the equivalent oscillator groups of FIG. 3 may become clear. In this consideration it will be recalled that similarly numbered items of FIG. 3 perform similar functions.

The emitter to collector paths of two composite transistors T4–5 and T6–7 are connected in a conducting orientation in parallel between terminals of a source of potential as indicated by the circled

symbols shown. Current limiting load resistors 107 and 125 are respectively connected between the collector electrodes of these indicated P-N-P transistors and the negative terminal of the symbolically indicated potential source. Illustratively, these load resistors have nominal values of 2200 ohms. In familiar multivibrator connection, capacitors C1 and C2, respectively, provide cross coupling from the collector electrodes of transistor T4–5 to the base electrode of transistor T6–7 and from the collector of the latter to the base of the former.

The potentiometer-resistor pairs 91 and 93 are respectively connected from a point of neutral potential, or ground, to the base electrode of the composite transistors T4–5 and T6–7. Thus the capacitor 89 cooperates with the adjustable resistor pair 91 and the capacitor 88 with the adjustable resistor pair 93 to control the conduction interval for the two composite transistors shown. This cooperation is well known in the multivibrator art and need not be explored in any detail here.

For purposes of illustration of the behavior of this multivibrator it may be well to consider a typical example in which all variables external to the structure of FIG. 4 are held constant. Assume first that transistor T4–5 is conducting and at a saturation level.

Transistor T6–7 is correspondingly cut off. Capacitor 88 thus tends to charge toward the full power supply potential through the resistor-capacitor-transistor paths indicated. Increase of the resistance value of the pair 91 thus serves to increase the time required for the capacitor 88 to reach a circuit shifting charge state. As this charge state is reached, however, the base electrodes and emitter electrode of transistor T4–5 arrive at a potential equilibrium of suitable value to stop conduction of this last noted composite transistor. Thus, by virtue of resistor 107, the collector potential falls.

This potential fall is coupled through capacitor 89 to the base electrode of transistor T6–7. Accordingly, this latter composite transistor begins to conduct heavily until charging of capacitor 88 is completed through the adjustable resistor pair 93. As will appear hereafter, the heavy conduction condition of transistor T6–7 corresponds to an OFF control condition for circuits in accordance with the invention.

Thus, upward adjustment of the resistance value of the pair 93 increases the OFF time of the circuit illustrated here and in FIG. 3. Similarly upward adjustment of the pair 91 corresponds to an increase in the ON control time of circuits in accordance with this embodiment of the invention.

Returning now to a consideration of the overall control circuitry of FIG. 3, the significance of this above detailed discussion of FIG. 4 becomes more clear. Consider first the normal condition in which photocell 51 is illuminated and photocell 53 is darkened. The former photocell thus conducts as a resistor of low value, from the positive potential source, lead 57, through adjusting potentiometer 61, by way of leads 62 and 66, to the common negative lead 55. At the same time, the darkened photocell 53 acts as a resistor of very large value and current through lead 64, by way of adjusting potentiometer 63, is held to a very small value.

Noting that photocells may vary substantially in effective resistance values, it is clear that the potential level of the lead 57 to the leads 62 and 64 varies widely in dependence upon the current conducted by the photocells 51 and 53 respectively.

Since commercially available photocells do vary unpredictably, the variable resistors, potentiometers 61 and 63 enable adjustment of the potential level of leads 62 and 64 to desired values under standard illumination values for the respectively associated photocells.

Inviting attention only to the lead 62 for the moment, illumination of the photocell 51 leads to current flow therethrough. Consequently the base voltage of transistor T1 is dropped, by action of potentiometer 61, to a level below that of the emitter electrode of this transistor T1. Accordingly current flows in the forwardly biased emitter to collector path of this transistor through resistor 101 to the negative potential indicated. For purposes of clarity only a circled indication of this negative polarity is indicated. Clearly, however, the common negative lead 55 is the source of this negative potential and connecting leads are not specifically shown for avoiding obscurity in the drawing. The potential level of the collector electrode of transistor T1 thus rises.

This potential rise is coupled to the base electrode of transistor T3 by way of lead 103. Accordingly, this transistor T3 tends to a cut off condition since the emitter electrode is fixed to ground potential as shown. Although in FIG. 3, resistors 105 and 107 are shown also associated with this grounded emitter electrode, these resistors actually are collector resistors for transistors T4 and T5, respectively. If transistor T3 is cut off, no current flows to lead 109 and a relay 117 associated therewith is de-energized.

The emitter to collector paths of transistors T1 and T2 are connected in parallel, through resistor 101, to the negative potential source 55. Both emitter electrodes of these transistors are connected directly to the positive potential source 57 and both collector electrodes are connected directly by way of lead 103, to the base electrode of transistor T3. Thus, even if transistor T1 is not conducting, conduction by transistor T2 similarly leads to cut off of transistor T3.

The base electrode of this transistor T2 is connected with the emitter electrode of transistor T5 and the base electrode of transistor T4. These two transistors, it will be recalled from the consideration of FIG. 4, make up one composite ON-OFF element of a multivibrator.

The base electrodes of both transistors T2 and T4 are connected in common. The emitter electrodes of both are connected to the source of positive potential 57. Thus the two transistors tend to conduct simultaneously. Hence, as the composite multivibrator element T4–5 conducts, so transistor T2 conducts. Accordingly, transistor T3 is cut off in correspondence with the conduction of the multivibrator transistors T4 and T5.

But the collector electrode of transistor T2 is connected directly to the base electrode of transistor T3. The base and emitter electrodes of both the transistors T2 and T4 are common connected. The collector electrodes of both transistors T2 and T4 are thus substantially at the same potential levels in the conducting state. Since this potential level drops in passage from the collector electrode of conducting transistor T4 to the emitter electrode of transistor T3 through resistor 105, it is clear this latter emitter electrode must be below the level of the associated base electrode which is connected directly to the collector electrode of transistor T2. Hence transistor T3 cannot conduct if transistor T4 does conduct. Accordingly, during ON times of the multivibrator transistors T4 and T5, the relay 117 is deenergized.

Now in this consideration of the input circuit group 81 of the array 71 it has been seen that, with photocell 51 illuminated, there is a normal tendency for transistor T3 to be cut off and preclude passage of current to lead 55. Further, it develops that under the condition of photocell 51 being dark, no current flows through resistor 61. Accordingly, the base electrode of transistor T1 is at the same positive potential as the emitter electrode of this transistor. Hence the transistor is cut off. In a first situation, this cut off of transistor T1 acts to turn on transistor T3 to supply current to common negative lead 55 through lead 109 and the actuating coil of a relay 117.

A diode 115 is properly poled and connected to lead 109 and to the collector electrode of transistor T3 to protect associated transistor electrodes against reverse inductive voltage surges from the associated relay windings.

It has been seen that with photocell 51 illuminated, transistor T3 conducts toward disabling relay 117. In another situation, with photocell 51 dark, this relay is energized by way of transistor T3 only if transistor T2 does not conduct. This conducting of transistor T2 corresponds to an ON condition of multivibrator transistors T4 and T5 as has been seen.

In summary then of the discussed phases of operation of circuits in accordance with the invention, when photocell 51 is illuminated, no current is supplied to actuate relay 117. If photocell 51, conversely, is dark, current does flow to actuate the relay during the periods when oscillator elements 85 are in a non-conducting condition.

This current is terminated, however, despite continued darkness of photocell 51, when oscillator elements 85 conduct under the influence of charging time constants associated with coupling capacitor 88 and variable resistor 91.

Only the normally lighted photocell 51 and the associated control element array 71 have thus far been considered. A like photocell 53 and a similar control element array 73 are associated with a normally darkened condition of the photocell. Upon illumination, this photocell 53 conducts current via adjustable resistor 63, lead 64, and lead 66. This current flow reflects in a lessened potential being applied to the base electrode of transistor T10. Following the detailed reasoning directed to the normally lighted system, the upper illustrated channel considered above, the operation of the normally dark system appears.

As transistor T10 conducts, a rise in collector potential is generated by resistor 121. This potential rise is coupled to the base electrode of transistor T9. Accordingly, this previously conducting transistor is cut off. Hence the prior conduction current which had been directed through lead 129 to actuating coils of a relay 137 is terminated. The relay thus tends to be thrown from the normal, energized position indicated upon illumination of the normally dark photocell. The behavior of the circuits under the control of the relay 137 and of associated relay 117 will be considered in detail hereafter. Diode 135 acts as a surge protector.

Now, as shown, transistor T9 normally conducts energizing current to relay 137 in the normal dark condition of photocell 53. Conversely, in the abnormal illuminated condition of this photocell, no energizing current flows through this transistor T9 to energize relay 137. But, neglecting the multivibrator elements noted heretofore, transistors T6 and T7, the conduction path of forwardly biased transistor T8 is connected in parallel with that of the transistor T9. Thus, whatever the condition of illumination of photocell 53, current may be passed to energize the relay 137 from transistor T8 by way of lead 129. An examination of the interrelation of the multivibrator elements 87 with the input elements 83 is in order. As shown, a voltage divider comprising resistors 123 and 128 interconnects a negative potential point with the collector electrode of multivibrator transistor T7. The base electrode of transistor T8 is connected to this voltage divider at a common point between resistors 123 and 128.

These resistors are coordinated with the potential levels applied to transistors T7 and T8 so that the base electrode of transistor T8 is raised above the cutoff level when transistor T7 oscillates to a heavy conduction condition. Typically, in the circuit shown, resistors 128 and 123 have values of 3300 ohms and 5100 ohms, respectively. Thus, as the collector electrode of the heavily conducting transistor T7 is effectively connected directly to a positive supply potential, the base electrode of transistor T8 is raised somewhat above ground potential. Hence this latter transistor is cut off. Accordingly, no current flows to relay 137 save by way of transistor T9.

In summary of the behavior of these illustrative control circuits in acordance with invention it may be advantageous to consider a typical behavior pattern. With photocell 51 illuminated and photocell 53 dark, energizing current flows continuously by way of transistor T9 and lead 129 to energize relay 137. At the same time, in this normal condition of illumination, transistor T1 conducts and transistor T3 is biased toward cutoff. Thus lead 109 and relay 117 tend to be de-energized. Now if the normally light photocell be darkened, i.e., if both photocells are de-energized, both relays 117 and 137 tend to be energized. The first, relay 117, tends to be energized through transistor T3. The second, relay 137, tends to be energized through transistor T9. But the multivibrator elements 85 and 87 oscillate between conduction and non-conduction conditions.

Transistor T9 is substantially independent of these oscilations. Accordingly relay 137 continues energized.

But transistor T2 is connected to the base electrode of transistor T3. The emitter and base electrodes of transistor T2, also, are respectively connected in common to the emitter and base electrodes of transistor T4, one component of multivibrator element 85. Hence, as transistor T4 conducts, so transistor T2 conducts. Thus, transistor T3 is rendered non-conducting as multivibrator element 85, and with it transistor T4 conducts. Accordingly, with both photocells darkened, the one relay 137 is continuously energized. The other relay 117 is periodically energized in correspondence with the OFF periods of transistor T4.

When both photocells are illuminated, relay 117 will be de-energized as considered heretofore. Transistor T9 is cut off so there is a tendency for relay 137 to be de-energized.

But transistor T8 supplies energizing current to this latter relay too. Hence, in correspondence with OFF periods of transistor T7, energizing current will be supplied periodically to this latter relay 137. This is because, it will be recalled, heavy conduction of transistor T7 results in cutting off transistor T8. Thus, with photocell 53 dark, relay 137 is continuously energized. With photocell 53 illuminated, relay 137 is periodically energized as transistor T7 is cut off by familiar multivibrator action.

This energizing of the two relays is given effect by circuitry associated with the relay contacts. Thus, with relay 117 normally de-energized as indicated in the drawing, alternating current from a well known electric power source 164 in the normal situation meets with an open circuit at lead 161 in an attempt to pass by way of lead 163 to compensating coil 165 for actuating armature 171. At the same time, the normally energized relay 137 is positioned away from open circuited lead 167 for directing current from generator 164 through lead 168 to compensating coil 166. Thus armature 172 is actuated to a normal position by the energizing of relay 137.

The control circuitry described hereinabove in connection with the description of FIGS. 3 and 4 is coupled in accordance with the invention to mechanical structures such as those described heretofore by way of armatures 171 and 172, and leads 181 and 182.

It will be seen from the description which precedes that the edge monitor device of the invention herein is a substantially foolproof apparatus. It is simple in operation and is readily constructed and installed with many existing systems in which a web is required to move through a processing apparatus in accordance with the desired lateral positioning. In addition to the novel electrical operation of the apparatus, it is noted that the sensitivity or response of the apparatus is controlled in a most elementary manner. The user merely adjusts the position of the two members 28 and 29 with respect to one another and has a visual indication of the sensitivity of the device. Clearly, this sensitivity is simply a function of the distance between the two slots 226 and 228.

It is believed that the invention has been set forth in sufficient detail such as to enable those skilled in this art to understand the same, to practice the same and to build structures embodying the same. The invention provides monitoring and adjustably precise positioning of a rapidly moving web with reliability. Obviously, other and varied embodiments of the invention for exerting this same dynamic control will readily occur to those skilled in the art. Such variations are capable of being made without in any way departing from the spirit or scope of the invention as defined in the appended claims.

What it is desired to claim by Letters Patent of the United States is:

1. Apparatus for processing a longitudinally transported web of material opaque to optical energy in a frequency band which comprises, signal controlled means for laterally positioning said web, monitor means comprising, first and second signal generating means responsive to optical energy in said frequency band for generating first and second indicating signals, optical energy supplying means for supplying optical energy in said frequency band, said optical energy supplying means and said optical energy responsive means being positioned vertically on opposite sides of said web and in cooperative relation with said first and second responsive means being positioned laterally on either side of a desired lateral position of an edge portion of said web, whereby said web normally shields one of said responsive means from said optical energy supplying means and exposes the other of said responsive means to optical energy from said supplying means, processing means for said web, said positioning means, said monitor means and said processing means being longitudinally positioned consecutively along the path of travel of said web, means connected in circuit with said responsive means for generating first and second control signals for said positioning means and multivibrator means triggered by said indicating signals for periodically interrupting supply of said control signals to said positioning means.

2. Apparatus for processing a longitudinally transported web which comprises, signal controlled means for laterally positioning edge portions of said web, monitor means disposed along the path of travel of said web at a first location for deriving first and second binary indicating signals indicative of the lateral positioning of said web, processing means positioned along the path of travel of said web at a second location, said positioning means, said monitor means and said processing means being consecutively positioned along the path of travel of said web, and means respectively responsive to said indicating signals for deriving alternative control signals for said positioning means, said responsive means including multivibrator means for periodically interrupting supply of control signals to said positioning means.

References Cited by the Examiner

UNITED STATES PATENTS

| 2,078,669 | 4/1937 | King | 242—57.1 |
|---|---|---|---|
| 2,635,826 | 4/1953 | Kuzinski | 242—57.1 |
| 2,643,117 | 6/1953 | Frisbie et al. | 242—57.1 |
| 2,777,069 | 1/1957 | Saeman | 250—219.1 |
| 2,786,675 | 3/1957 | Montefalco et al. | 226—20 |
| 2,860,840 | 11/1958 | Jacobsen et al. | 242—57.1 |
| 2,860,841 | 11/1958 | Jacobsen | 242—57.1 |
| 2,962,596 | 11/1960 | Leimer et al. | 250—219.12 |
| 3,096,919 | 7/1963 | Snyder | 250—219.1 X |

FOREIGN PATENTS 741,320  11/1955  Great Britain.

MERVIN STEIN, *Primary Examiner.*